(12) United States Patent
Rosen et al.

(10) Patent No.: US 7,332,093 B2
(45) Date of Patent: Feb. 19, 2008

(54) METHOD FOR WATER PURIFICATION

(75) Inventors: Christian Rosen, Malmö (SE); Pernille Ingildsen, Kirke Hyllinge (DK); Thomas Munk-Nielsen, Frederiksberg (DK)

(73) Assignee: Kruger Off-Shore A/S, Soborg (DK)

( * ) Notice: Subject to any disclaimer, the term of this patent is extended or adjusted under 35 U.S.C. 154(b) by 58 days.

(21) Appl. No.: 11/288,128

(22) Filed: Nov. 29, 2005

(65) Prior Publication Data

US 2006/0131232 A1    Jun. 22, 2006

Related U.S. Application Data

(60) Provisional application No. 60/631,737, filed on Nov. 29, 2004.

(51) Int. Cl.
*B01D 37/04*    (2006.01)

(52) U.S. Cl. ..................................... 210/739

(58) Field of Classification Search ......... 210/739–746
See application file for complete search history.

(56) References Cited

U.S. PATENT DOCUMENTS 5,304,308 A     4/1994  Tsumura et al.
5,589,068 A    12/1996  Nielsen
5,733,456 A     3/1998  Okey et al.
5,989,428 A    11/1999  Goronszy et al.
6,444,125 B2 *  9/2002  Han ........................ 210/605
2002/0043486 A1 4/2002  Lee et al.

FOREIGN PATENT DOCUMENTS

DE       3835374 A1    4/1990
DK      199101677      10/1991
JP       05050093 A  *  3/1993

* cited by examiner

*Primary Examiner*—Chester T. Barry
(74) *Attorney, Agent, or Firm*—Finnegan, Henderson, Farabow, Garrett, & Dunner L.L.P.

(57) ABSTRACT

An improved method of controlling a wastewater treatment plant, by identifying a condition and as a result of this apparent condition changing the treatment of the waste water. It especially relates to a method of improving the nutrient removal in wastewater treatment plants. The control method includes a cycle with two phases, a first and a second phase. In the first phase aeration continues until sufficient nitrification is obtained and an uptake of phosphate reaches a defined level based on the current load or capacity situation. Then the second phase continues until sufficient denitrification is obtained and until the storage of intercellular compounds in phosphorus accumulation organisms (PAO) reaches a defined level.

11 Claims, 5 Drawing Sheets

METHOD FOR WATER PURIFICATION

CROSS REFERENCE TO RELATED APPLICATIONS

This application claims the benefit of U.S. Provisional Application No. 60/631,737, filed on Nov. 29, 2004, which is incorporated herein by reference in its entirety.

The present invention relates to an improved method of controlling a wastewater treatment plant. In particular the invention relates to a method of identifying a condition and as a result of this apparent condition change the treatment of the waste water. Especially the present invention relates to a method for improving the nutrient removal in wastewater treatment plants.

In previously known water treatment plants the removal of biologic material and nitrogen is regulated by using different control and regulation means such as those described in EP 0 642 469, and phosphorus is removed in a separate step with or without precipitation agents.

The object of the invention is to obtain an overall improved purification by optimizing two or more processes relative to each other. The invention provides a control method which adds or optimises the control of a secondary purifying process without causing substantial detrimental effects to one or more primary purifying processes occupying the main part of the resources in the waste water treatment plant. An example of this could be to introduce or to optimise the process for biological removal of phosphorus while degradation of organic matter and nitrate and ammonium compounds continues to take place in the waste water treatment plant with practically unchanged effectiveness.

Generally control of the phase lengths can generally be carried out according to two different principles: time-based control and on-line measurement based control. Time-based control is simply assigning specific phase lengths either in a constant fashion or by allowing the phase lengths to change over the day according to a predefined pattern. Although simple in principle, time-based control can be rather potent as it is possible to define relatively sophisticated time patterns for the phase lengths. However, when the load or other important factors change in an unknown manner, phase time (i.e. capacity) will be lost, too much energy will be used or the desired output quality will no be met. By using on-line measurement based control as described according to the present invention, some or all of these problems can be solved since on-line measurement based control has the ability to track the load changes and adjust the phase lengths accordingly. There are several different strategies to implement the measurement-based control.

A further object of the invention is to provide an improved control method for treating wastewater in which the amount of precipitation agents can be reduced especially when removing phosphorus.

A reduction in the amount of precipitation agents used in a water treatment plant does not only reduce the operating costs it also reduces the environmental impact of such a plant. Since smaller amounts of precipitation agents are used, smaller amounts of precipitated chemical compounds are present in the sludge thus resulting in a sludge being more suitable for agricultural purposes.

Thus the present invention provides a control method comprising a cycle with two phases, a first and a second phase, the first phase continues until sufficient nitrification is obtained and the uptake of phosphate reaches a defined level based on the current load or capacity situation, and the second phase continues until sufficient denitrification is obtained and until the storage of intercellular compounds in the phosphorus accumulation organisms (PAO) reaches a defined level.

"Sufficient" means that a desired level has been obtained; the desired level can be defined by a constant parameter or by a parameter which is continuously adapted.

Preferably the uptake of phosphorus in the first step is quantified by at least one system parameter (A, B, C, . . . ) and at least one control parameter $a_N$ is derived from the at least one system parameter; the nitrification of the first step is quantified by at least one system parameter (G, H, J, . . . ) and at least one control parameter $g_N$ is derived from the at least one system parameter; also the storage of intercellular compounds in the second step is quantified by a system parameter (A, B, C, . . . ) and at least one control parameter $a_{DN}$ is derived from the at least one system parameter; and the denitrification of the second step is quantified by at least one system parameter (G, H, J, . . . ) and at least one control parameter $g_{DN}$ is derived from the at least one system parameter.

The control method for wastewater treatment in a plant having a purifying section can be implemented according to the following:
a) continuously measuring one or more system parameters,
b) determining a first control parameter on the basis of the measured values from step a) and a first control function,
c) determining a first control action on the basis of the measured values from step a) and the first control parameter of step b) and subsequently,
d) implementing the first control action,
e) letting said purifying section change conditions,
f) determining a second control parameter on the basis of the measured values from step a) and a second control function,
g) determining a second control action on the basis of the determined control parameter and subsequently,
h) implementing the second control action, and
i) letting the purifying section return to the conditions of step b) to d)
k) return to step b).

In a preferred embodiment the limit for the first or the second control parameter is adaptive. When a limit is adaptive it is normally depending e.g. on daily means level of $PO_4$ and the actual $NH_4$ and $NO_3$ load or another system parameter. The advantage of adaptive limits is that the control automatically prioritizes the phosphorus removal when the nitrogen load is low, i.e. there is excess capacity in the plant, and inactivates the phosphorus control when the nitrogen load is high.

In a preferred embodiment the implementation of the method further comprises the steps:
j) measuring one or more system parameter
k) determining a third control parameter on the basis of the measured results in step j and a third selected control function
l) selecting a third control action on the basis of the in step j measured results and the determined third control parameter and subsequently
m) implementing the third control action and
n) letting the section reach anoxic conditions Preferably the first control parameter is determined on the basis of measurements for at least two system parameters and control functions associated with said system parameters, and the second control parameter is determined on the basis of measurements for at least two system parameters and control functions associated with said system parameters.

The measured system parameters can be selected from the group consisting of nitrate concentration, ammonium concentration, phosphate concentration, oxygen concentration, COD (chemical oxygen demand), BOD (biochemical oxygen demand), TOC (total organic carbon), respirometry, NADH (nicotinamide adenine dinucleotide) and temperature.

Preferably a measurement for a phosphate concentration is used as basis for the second control parameter, and more preferred measurements of phosphate, nitrate and ammonium concentration are used as basis for the second control parameter.

Also a redox measurement can be used to measure one or more of the system parameters.

Preferably the system parameter in step a) is the concentration of $NH_4^+$ and $NO_3^-$ and the first control action is selected from the group consisting of stopping supply of nitrate, stopping aeration and keeping the aeration turned off.

Preferably the second measurement measures the concentration of $PO_4$ and the second control action in selected from the group consisting of supplying carbon sources, supplying nitrate and starting aeration.

Preferably the system parameters in step j) are the concentration of $NH_4^+$ of $NO_3^-$ or the concentration of $PO_4$ and the third control action is stopping aeration.

Preferably the purifying section is let to reach anaerobic conditions at a time calculated on the basis of at least two system parameters.

Preferably the anaerobic conditions are abolished at a time calculated on the basis of at least two measured system parameters.

In a most preferred embodiment the system parameters are selected from the group consisting of nitrate concentration, ammonium concentration, phosphate concentration, oxygen concentration and temperature.

In a most preferred implementation the method assuring increased biological phosphorous removal in a purifying plant with one or more aerated sections comprises the following steps:
a) continuously determining the concentrations or the rates of formation for $NH_4$, $NO_3$ and $PO_4$;
b) determining two control parameters: $K_{nN}=f(NH_4,NO_3)$ and $K_{nbiop}=f(PO_4,NH_4)$ on the basis of the concentrations or the rates of formation for $NH_4$, $NO_3$ and $PO_4$;
c) implementing a control action terminating the nitrification phase when $K_{nN}$ and $K_{nbiop}$ are fulfilled;
e) letting the purifying section reach anaerobic conditions;
f) determining two control parameters: $K_{dnN}=f(NH_4,NO_3)$ and $K_{dnbiop}=f(PO_4,NH_4, NO_3)$
g) determining a control action to terminate the denitrification phase when $K_{dnN}$ and $K_{dnbiop}$ are fulfilled;
h) implementing the determined control action,
j) letting the purifying section return to aerobic condition and
k) return to step b).

Preferably the invention is used in plants having a load of more than 10.000 PE, more preferred in plants having a load of more than 100.000 PE and most preferred in plants having a load of more than 250.000 PE.

Preferably the invention is used in plants having a feed volume>2.000 m³/day, more preferred a feed volume>20.000 m³/day, and most preferred a feed volume>60.000 m³/day.

In a preferred embodiment the system parameters determined by used of sensors. Preferably the sensors are on-line meters for measuring of ammonium nitrate and/or phosphate e.g. such meters are made by:
  Hach Lange
  Danfoss
  Endress+Hauser
  Bran+Luebbe
  WTW (Wissenschaftlich-Technische Werkstätten GmbH & co. KG)
  Applied Spectrometry Associates, Inc. (ChemScan Analyzers)

Definitions:

Load/capacity: The definition of load can be split into the definition of the hydraulic load, the organic matter load and the nutrient load. The hydraulic load is the volume of the inlet flow per day [m3/h]. The organic matter load is the mass organic matter per day in the inlet flow [kg/day]. The nutrient load is the mass of nutrient in the inlet flow per day [kg/day]. The definition of the capacity is the maximum load which is possible for the biological processes to remove.

A system parameter is a parameter which contains information of the system and which parameter can be quantified. Relevant system parameters could be selected from the group consisting of component concentrations, e.g. $NO_3$, $NH_4$, $PO_4$, COD (chemical oxygen demand), BOD (biochemical oxygen demand), TOC (total organic carbon), redox potential and temperature. That a system parameter is measured continuously means that measuring of the system parameter is always possible, normally the measurements will be registered at certain time steps e.g. every 30 sec. or at request.

A control parameter is a parameter (variable or constant) which is selected or calculated from one or more registered values of the system parameters in order to determine an appropriate control action. The control parameter can e.g. be a set point or an upper or lower limit. An example of a control parameter is the desired value of the oxygen concentration in a nitrification tank. Examples of system parameters associated with this control parameter comprise the nitrate concentration, the redox potential and the phosphate concentration. Another example of a control parameter is the actual ammonium concentration in a denitrification tank. Examples of system parameters associated with this control parameter comprise the ammonium concentration, the oxygen concentration and the oxygen supply.

If the control parameter is calculated e.g. from more than one system parameter it is calculated by a control function. A control function defines the correlation between the control parameter and the system parameter or a value derived from the system parameter. The correlation between the system parameter and the control parameter is normally defined according to a mathematical model of the deterministic or the stochastic type which model might be totally or partly determined from past data and experience from earlier operations. The used control functions are typically discontinuous functions which are a combination of various continuous functions.

A preferred embodiment of the invention is based on the well known finding that by forcing phosphorus removing bacteria—Phosphorus Accumulating Organisms PAO—to live under changing conditions in a controlled manner the PAO are as a net result of the process able to remove an increased amount of phosphorus from a surrounding media.

This finding is e.g. described in U.S. Pat. No. 5,304,308 where the operating conditions are alternately changing between anaerobic and aerobic conditions. This document describes how to remove both nitrogen and phosphorus components in a two compartment purification plant. Nitrogen is eliminated such that $NH_4$—N is oxidized under an aerobic condition to $NO_3$—N by an activity of nitrifying bacteria, which is then reduced under an anaerobic condition to $NO_2$ by an activity of denitrifying bacteria. In this intermittent aeration process, the phosphorus release from the activated sludge occurs after the denitrification is finished and oxygen molecules originating from NO3—N become absent from the tank, and subsequently the phosphorus absorption is performed in the next aeration step. Operations of the first and second aeration tanks are simultaneously transferred from the agitation to the aeration based on detection of an ORP (oxidation-reduction potential) bending point or the ORP value equal to the predetermined value which points represent the completion of the denitrification in the second aeration tank. This method is directed to a constant removal of both nitrogen and phosphorus from the waste water, and according to this method no prioritizing between the two processes is decided. Also this process is locked to a specific plant type with two aerated compartments and one forward stream passing both compartments.

The method according to the present invention can be performed in all kind of different plants, also in a single tank/section/compartment where it is possible to add aeration and the method is directed to a constant removal of nitrogen and occasional biological removal of phosphorus. When the preferred embodiment of the invention is applied an increased part of the phosphorus in the wastewater is bound in the PAO and removed from the process as these organisms are removed as sludge, therefore less phosphorus has to be precipitated with precipitation agents giving the advantage of sludge being more suitable for agricultural use, in that biological bound phosphorus is more readily available for plants. When implementing the present invention a control method can be added to an existing plant with one or more compartments thereby increasing the biological phosphorus removal, if the control method is added or applied to a purification plant with more than one compartment the compartments are controlled individually which makes operation of the plant more flexible. Also it can be desirable to add a new compartment to an existing purification plant when applying the control method of the present invention in order to optimise the process and to increase phosphorus removal.

In the present application the following terms will be used to describe the conditions in the water treatment plant:

Aerobic conditions mean that oxygen ($O_2$) is present at the location. Under aerobic conditions the bacteria decompose organic matter and convert ammonia and nitrous compounds into nitrate, sludge and carbon dioxide. Easily degradable organic material is the fastest to be decomposed. Nitrifying bacteria convert ammonia and other nitrogenous compounds into nitrate while heavier organic material is decomposed by other bacteria. The phosphorus removing bacteria take up phosphorus.

Anoxic conditions mean that nitrate ($NO_3$) but not free oxygen is present at the location. Under anoxic conditions the denitrifying bacteria use nitrate as oxygen source to compose organic matter and during this process nitrate is converted into free nitrogen. The phosphorus removing bacteria also take up phosphorus under these conditions.

Anaerobic conditions mean that neither nitrate nor oxygen is present at the location. Under anaerobic condition the phosphorus removing bacteria are able to grow when supplied with an easily degradable carbon source and an internal stock of carbon sources stockpiles in the phosphorus removing bacteria.

When anaerobic conditions are applied to a compartment or a section of a purification plant, the processes normally taking place in this compartment e.g. denitrification and/or ammonia degradation are stopped or slowed down. Therefore during the growth of the phosphorus removing bacteria the plant may not be able to purify with the same efficiency for nitrogen removal since these processes now have less process time. It is therefore preferred to allow the phosphorus removing bacteria to grow and build up the internal carbon sources needed for the processes taking up phosphorus during periods with excess capacity for instance during certain times of the day with a low load of wastewater. However since it can be difficult to predict exactly when there is excess capacity in the system and for how long, there is a risk that the plant might not have sufficient nitrogen removal capacity when needed. Further, a sudden window of opportunity will not be utilised by just using fixed on and off times. It is therefore preferred to use the values of one or more measured system parameters to determine when a plant or a plant section has capacity available for removing phosphorus and optionally for how long.

However it is not only the amount of phosphorus removing bacteria or the amount of internal carbon sources that determines the efficiency of the phosphorus removal. If too few bacteria are present only a small amount of phosphorus can be taken up. If the amount of internal carbon sources in the bacteria is too small once again only a small amount of phosphorus can be taken up. Further if the ratio between the internal carbon sources and the amount of bacteria is too small the uptake of phosphorus is too slow and the phosphorus might not be consumed before the water is passed on. In order to increase the ratio it will be necessary to ensure the bacteria access to an easily degradable carbon source and to apply anaerobic conditions to the section inducing a growth period. Increasing the ratio then takes time and this time has to be taken from other processes such as the nitrification and denitrification processes. An important aspect of the invention therefore aims at optimizing all concerned processes relative to each other in order to obtain an overall improved purification of the waste water.

In a preferred embodiment the control method described here aims at introducing Enhanced Biological Phosphorous Removal (EBPR) in a biological wastewater treatment plant which is not necessarily designed for EBPR. EBPR is achieved by means of controlling the biological reactions in the existing biological reactors in contrast to building additional reactors. The control method can be used for EBPR alone or in combination with Biological Nitrogen Removal (BNR). In the case of combination of EBPR and BNR, the processes involved in EBPR and BNR, respectively, compete for the same process time. Thus, in lack of capacity for both, a prioritisation between EBPR and BNR must be done. In general, this prioritisation favours BNR due to discharge regulations and the possibility to remove phosphorous by means of precipitation chemicals. In the combined case, the control method exploits the fact that treatment plants are experiencing varying conditions with high and low load situations. In low load periods, the treatment plant normally has an overcapacity and this is utilised by promoting EBPR within the existing reactor volumes.

The process is controlled using intermittent aeration. This means that the process conditions are alternated between aerobic (aeration), anoxic (agitation) and anaerobic (agitation) conditions. The aerobic phase is referred to as the N-phase and the anoxic and anaerobic phases together constitute the DN-phase. The N- and DN-phase lengths are determined based on the current loan/capacity situation. The length of the N-phase is determined so that sufficient uptake of phosphate and, if combined with BNR, nitrification are achieved. The length of the DN-phase is determined so that sufficient storage of intercellular compounds in the phosphorus accumulating organisms (PAO) and, if combined with BNR, denitrification are achieved.

The control method comprises a cycle with two phase:

The reactor is aerated (N-phase) until the uptake of phosphate reaches a level determined based on the current load/capacity situation. To quantify the uptake of phosphorus, a system parameter, A, is measured. To quantify the load/capacity situation one or several system parameters, A, B, C, . . . , are measured. From A, B, C, . . . , a control parameter $a_N$, is derived. The length of the N-phase is a function of A and of $a_N$, e.g. the N-phase continues as long as $A > a_N$, when $A \leq a_N$ a control action is implemented in order to stop the N-phase. When EBPR is combined with BNR, the aeration continues until sufficient nitrification is obtained and the uptake of phosphate reaches a level determined based on the current load/capacity situation. To quantify the nitrification, a system parameter, G, is measured. To quantify the load/capacity situation, one or several system parameters, G, H, J, . . . , are measured. From G, H, J, . . . , a control parameter, $g_N$, is derived. The length of the N-phase is a function of A, $a_N$, G and $g_N$, e.g. the N-phase continues as long as $A > a_N$ & $G > g_N$. The continuation of the N-phase is realised by controlling the aeration based on the current load/capacity situation.

The reactor is agitated (DN-phase) until the storage of intercellular compounds reaches a level which level has been determined based on the current load/capacity situation. To quantify the storage of intercellular compounds, a system parameter, A, is measured. To quantify the load/capacity situation one or several system parameters, A, B, C, . . . , are measured. From A, B, C, . . . , a control parameter, $a_{DN}$, is derived. The length of the DN-phase is a function of A and $a_{DN}$, e.g. the DN-phase continues as long as $A < a_{DN}$. When EBPR is combined with BNR, the DN-phase continues until sufficient denitrification is obtained and until the storage of intercellular compounds reaches a level determined based on the current load/capacity situation. To quantify the denitrification a system parameter, G, is measured. To quantify the load/capacity situation, one or several system parameters, G, H, J, . . . , are measured. From G, H, J, . . . , a control parameter, $g_{DN}$, is derived. The length of the DN-phase is a function of A, $a_{DN}$, G and $g_{DN}$, e.g. the DN-phase continues as long as $A < a_{DN}$ & $G < g_{DN}$. The continuation of the DN-phase is realised by keeping the aeration off.

The present invention is especially suited when using multiple control functions. The use of multiple control functions is described in detail in EP 642 469 and is characterized in that a control parameter is determined on the basis of the measurement results for at least two system parameters and the control functions associated with said system parameters.

The use of multiple control functions is based on the knowledge that some of the system parameters measured during the control of a waste water purification plant provide information about the same physical conditions, and that consequently such system parameters may be used to obtain a more accurate, quick and reliable identification of the state of the plant and determination of the control parameter, thereby resulting in a more efficient control of the plant.

When using multiple control functions the control parameter can be determined on the basis of a weighted combination of individual control parameters where each of the individual control parameter $cp_i$ is a function of one system parameter. In the multiple control functions the individual control parameters are weighted relative to their suitability in connection with the control action in question.

The use such control allows the control functions used in the determination of the control parameter to be weighted differently depending on the magnitude of the parameter.

The control parameter may e.g. be determined by use of one of the following two formulas:

$$CP = \frac{w_1 cp_1 + w_2 cp_2 + w_3 cp_3 + \ldots + w_m cp_m}{w_1 + w_2 + w_3 + \ldots + w_m} \quad (1)$$

Wherein CP is the resulting control parameter, $w_i$ are weights, $cp_i$ are the individual control parameter determined with the individual control functions and m is a positive integer above 1, $$CP = \frac{w_1 cp_1^{n_1+1} + w_2 cp_2^{n_2+1} + w_3 cp_3^{n_3+1} + \ldots + w_m cp_m^{n_m+1}}{w_1 cp_1^{n_1} + w_2 cp_2^{n_2} + w_3 cp_3^{n_3} + \ldots + w_m cp_m^{n_m}} \quad (2)$$

Wherein CP, $w_i$, $cp_i$ and m have the meaning defined above, and wherein $n_i$ are real numbers.

The determination of the control parameter using weights for the individual control functions may further be carried out by using a combination of different continuous functions, such as exponential, logarithmic and potency functions, i.e. using conventional statistic and stochastic models.

The determination of the control parameter and the subsequent selection of the control action are preferably carried out using a mathematical model for the purification plant which defines the correlation between system parameters, derived system parameters and control parameters and which can describe the state of the purification plant at the relevant point of time. Alternatively, the control action may be determined on the basis of a predetermined set of rules.

Another variant of using multiple control functions is characterized in that the quality of the measurement results is evaluated and that the control parameter is determined on the basis of the evaluated measurement results.

The evaluation of the quality of the measurement results is preferably carried out using the method described in DK patent application No. 1677/91 having the title "Method of controlling waste water purification plants using quality evaluation of measurement data".

Reference is made to the above application for a more detailed description of the way in which the evaluation of the quality of the measurement results is carried out in the above-mentioned preferred variation of using multiple control functions.

The quality evaluation of the measurement results is preferably carried out on the basis of a comparison of the measurement value for at least one parameter with an expected dynamic value interval calculated continuously on the basis of the mathematical model and a simultaneous and/or previous measurement of one or several other parameters and/or a previous measurement of the same parameter.

The expected dynamic value interval is preferably determined by calculation of an expected dynamic value and maximum variations there from.

More preferably, the quality evaluation of the measurement results is carried out by evaluating the credibility of the measurement value on the basis of the comparison of the measurement value with the expected dynamic value interval by the allocation of a credibility factor which in combination with the measurement value is used in the subsequent determination of the control parameter.

Prior to the determination of the control parameter, the measurement results may possibly be corrected with a value corresponding to the magnitude of the identifiable measurement interference, if any.

As used herein the term "identifiable measurement interference" means measurement interference caused by influences imposed on the purification plant in connection with the control of same.

The quantification of the identifiable measurement interference is preferably carried out on the basis of the mathematical model and past data of response courses for control modifications of the same type carried out previously.

In the above described variant of multiple control, the control parameter is determined at any time on the basis of the last credible measurement results of those available and b) weighting of same according to their credibility, thereby obtaining an optimum control compared to the collected material of measurement results, and which control is far more efficient than the control obtained with the prior art methods.

The control parameter is determined on the basis of the collected measurement values for two or more system parameters and the control functions and credibility factors associated therewith.

In this case the control parameter may e.g. be determined by using one of the following two formulas:

$$CP = \frac{w_1 cf_1 cp_1 + w_2 cf_2 cp_2 + w_3 cf_3 cp_3 + \ldots + w_m cf_m cp_m}{w_1 cf_1 + w_2 cf_2 + w_3 cf_3 + \ldots + w_m cf_m}$$

Wherein CP, $W_1$, $cp_1$ and m have the meaning defined above, and wherein $cf_1$ is a credibility factor, $$CP = \frac{w_1 cf_1 cp_1^{n_1+1} + w_2 cf_2 cp_2^{n_2+1} + w_3 cf_3 cp_3^{n_3+1} + \ldots + w_m cf_m cp_m^{n_m+1}}{w_1 cf_1 cp_1^{n_1} + w_2 cf_2 cp_2^{n_2} + w_3 cf_3 cp_3^{n_3} + \ldots + w_m cf_m cp_m^{n_m}}$$

Wherein CP, $cp_1$, $cf_1$, n and m have the meaning defined above.

The method according to the invention is preferably carried out using an integral control and computer system (control apparatus) collecting and storing measurement results and control signals, processing the collected data using a mathematical model and implementing new control actions.

Preferably the method is used in wastewater treatment plants without separate step for biological phosphorus removal e.g. Biodenitro, pre-denitryifying process AO etc. However improved phosphorus removal can also be achieved in wastewater treatment plans with separate step for biological phosphorus removal e.g. biodepho, pre-denitrifying process A2O etc.

An effect of using the invention is that the overall bacteria flora in the wastewater treatment plant slowly changes reaching conditions which further improves the treatment of the wastewater. Depending on the plant the adaptation of the bacteria flora could take around a month and as the conditions, when lengthening the anaerobic time period, favours the PAO's, this population will increase.

The invention will be described in further details with reference to the figures.

Figure 6A:
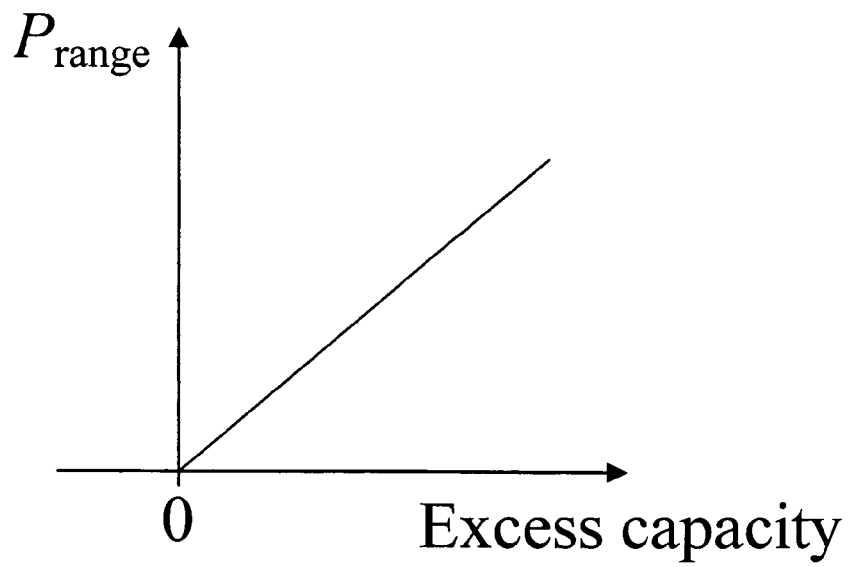
Figure 6B:
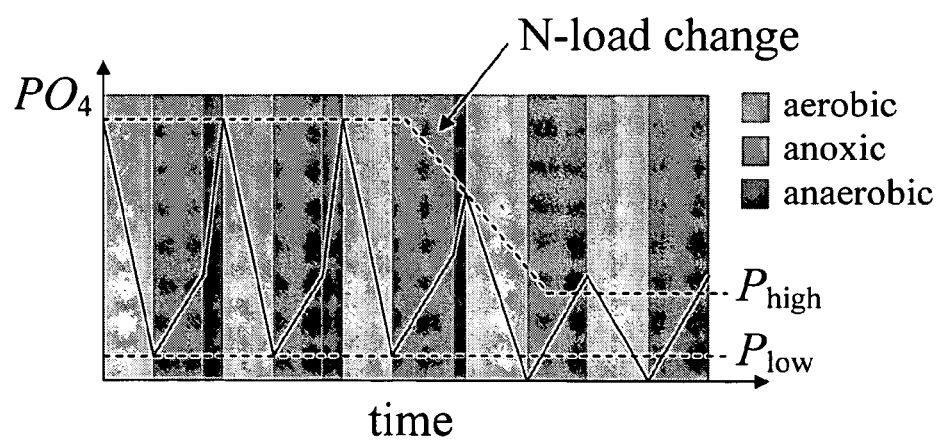

FIG. 6A P-range as a function of the excess nitrogen removal capacity;

FIG. 6B Illustration of how the phosphate limits change with changing nitrogen load.

Figure 1:
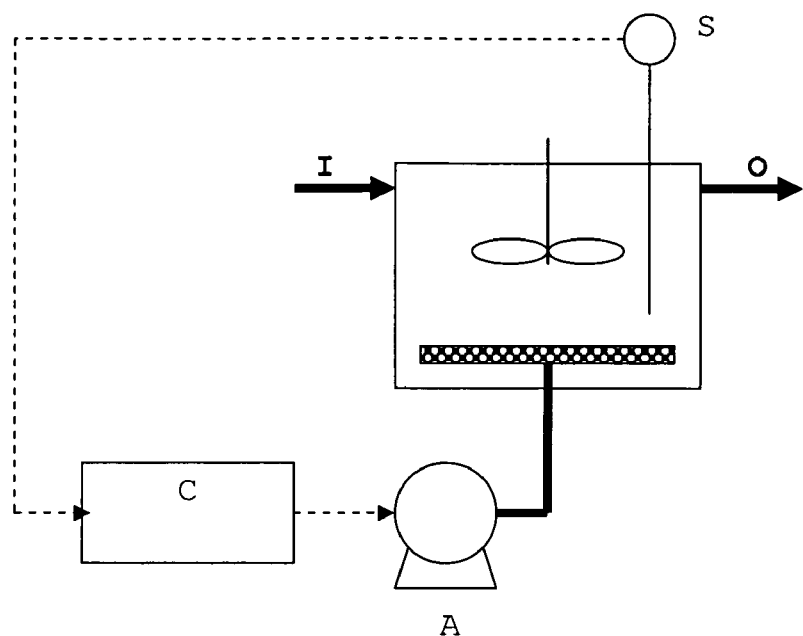
FIG. 1 illustrates compartment of a plant functioning according to the invention.

FIG. 1 shows a compartment in a purification plant with a combined treatment of EBPR and BNR. The compartment comprises an inlet I, an outlet O, a sensor S, a ventilator A and a controller C. The inlet I supplies the reactor with wastewater and treated wastewater is drawn from the outlet O of the reactor. In the reactor, the measured system parameters, which are registered with the sensor S, are ammonium ($NH_4$), nitrate ($NO_3$), phosphate ($PO_4$) and dissolved oxygen (DO) concentrations. The controller C receives the values from the sensor and controls the amount of air applied to the compartment, the described control cycle is repeated indefinitely. During the N-phase, the ammonium concentration is decreased by nitrification of ammonium to nitrate (via nitrite) and phosphate is stored in the PAO cells during phosphate uptake. During the DN-phase, the nitrate concentration is decreased by denitrification and the phosphate concentration is increased due to phosphate release.

N-phase. $PO_4$ is used to quantify the phosphate uptake. $NH_4$ is used to quantify the nitrification of ammonia to nitrate. $NH_4$, $NO_3$ and $PO_4$ are used to quantify the current load/capacity situation. Aeration of the reactor is maintained by controlling the DO concentration to a $DO_{sp}$. The N-phase continues until $NH_4$ is lower than the level $NH_{4,low}$ and $PO_4$ is lower than $PO_{4,low}$. The level $NH_{4,low}$ is a function of the current $NH_4$ and $NO_3$ measurements. The level $PO^{4,low}$ is a function of the current $NH_4$, $NO_3$ and $PO_4$ measurements. The level $DO_{sp}$ is a function of current $NH_4$ and $NO_3$ measurements.

DN-phase. $PO_4$ is used to quantify the phosphate release. $NO_3$ is used to quantify the denitrification of nitrate to gaseous nitrogen. $NH_4$, $NO_3$ and PO4 are used to quantify the current load/capacity situation. Aeration is turned off by controlling the DO concentration to $DO_{sp}=0$. The DN-phase continues until $NO_3$ is lower than the level $NO_{3,low}$ and $PO_4$ is higher than the level $PO^{4,high}$. The level $NO_{3,low}$ is a function of the current $NH_4$ and $NO_3$ measurements. The level $PO^{4,high}$ is a function of the current $NH_4$, $NO_3$ and $PO_4$ measurements.

Figure 2:
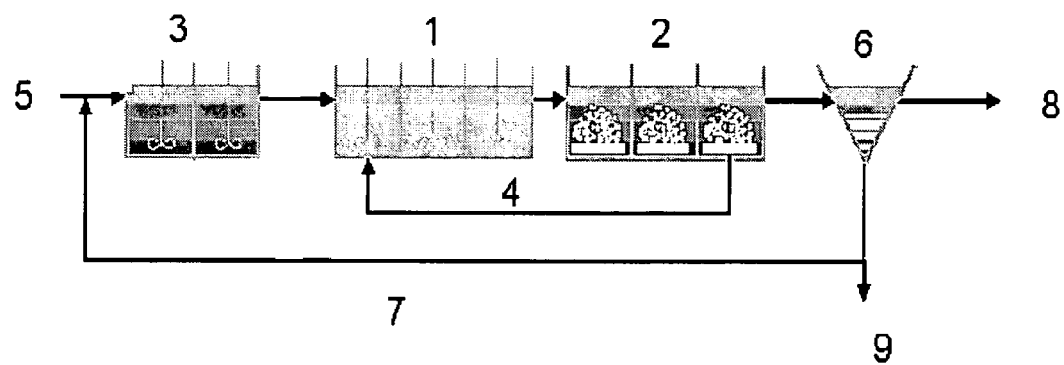
FIG. 2 illustrates a pre-denitrifying plant with recirculation.

FIG. 2 shows a pre-denitrification system with recirculation. In this plant feed is supplied to a first compartment 1 together with a recycled stream 4 from a second compartment 2. The conditions in the first compartment are monitored, system parameters are measured and the recycled stream flow to the compartment is regulated. The compartments can be stirred by stirring means. The first compartment 1 is traditionally kept at anoxic conditions by not allowing the compartment to be aerated, e.g. by not supplying any air, and by supplying the compartment with nitrate via the recycled stream 4 (explained below). In the first compartment denitrifying bacteria convert the supplied nitrate to gaseous nitrogen using the freshly supplied organic material. By this process the amount of nitrate decreases and since ammonia is supplied with the freshly introduced stream the ammonia concentration may rise. From the first compartment material is supplied to the second compartment in which it is kept at aerobic conditions, e.g. by aerating the wastewater. In the second compartment organic matter is decomposed and the supplied ammonia and nitrogenous compounds are degraded to nitrate. In the second compartment further measurements of system parameters are made and on the basis of at least one of the measured system parameters a control action is implemented e.g. a change in the amount of stream being recycled. In this process up to 10 times of the freshly supplied material is recycled, preferably the recycle rate is approximately 5 times the freshly supplied material. From the second compartment the stream can be let out to the surroundings 8 optionally via a sedimentation unit 6 or in case no phosphorus removal has been performed to a phosphorus removing unit. The phosphorus removing unit typically uses precipitating agents to remove phosphorus but electrochemical processes can also be used. In this embodiment a phosphorus removing unit 3 is place upstream to the first compartment.

By measuring a system parameter in e.g. the second compartment, it can be calculated whether it is possible to stop or reduce the recycling from the second compartment for a while. This is the case if e.g. the amount of nitrate is sufficiently low to be lead into the surroundings or if the second tank has excess storage capacity for supplied material. When the supply of nitrate to the first tank is reduced, the conditions in the first tank will change from anoxic to anaerobic. Depending on how much the supply of nitrate to the first tank is reduced a mixture of anoxic and anaerobic conditions can be present in the section e.g. in regions close to the inlet of nitrate there is anoxic conditions and in regions further away there is anaerobic conditions since the nitrate has been consumed. Now on the basis of measurements and calculations easily degradable organic material can be supplied to the first compartment, if needed, either as separated stream, from the freshly supplied stream or in combination thereof. Under these conditions the phosphorous removing bacteria begin to grown and as described earlier the bacteria first release phosphorous and increase in number and their internal carbon sources. When the materials then flows from the first compartment to the second compartment, having aerobic conditions, the phosphorous removing bacteria take up the phosphorous again and since their number have increased an increased amount of phosphorous is taken up by the bacteria. On the basis of measured system parameters it is determined when to abolish the anaerobic conditions in the first compartment which can be done by increasing the supply of nitrate to the first compartment e.g. by increasing/starting the recycling from the second compartment being rich in nitrate. Since the phosphorous removing bacteria have taken up more phosphorous, a smaller amount, if any, has to be precipitated by precipitating agents resulting in reduced consumption of precipitation agents.

Figure 3A:
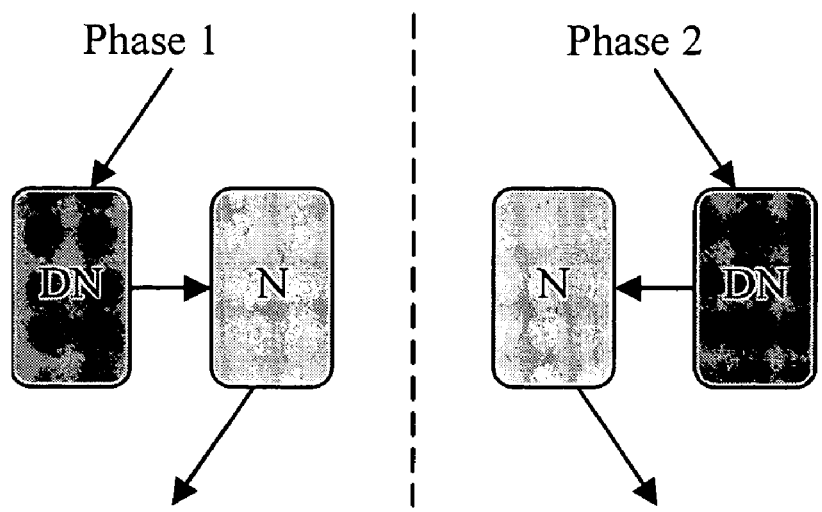
FIG. 3A illustrates the main phases at an alternating EBNR process. DN: anoxic conditions, N: aerobic conditions (other intermediate phases may also be used)

FIG. 3A illustrates an alternating plant. The alternating process relies on a cyclic operating schedule, which alters the flow through a tank set (normally two tanks) in a reoccurring fashion. For enhanced biological nitrogen removal (EBNR), the cycle consists of at least two phases—aerobic (nitrification) and anoxic (denitrification) according to FIG. 3. The phases are generally significantly shorter than the hydraulic retention time, which allows avoidance of nitrate recirculation. The timing of the outflow of the reactors can be optimized and this is often done to obtain the lowest possible effluent ammonia concentration, i.e. the outflow is drawn from the tank with the lowest $NH_4$ concentration. The two main phases can be supplemented by several more, for instance both reactors are aerated, water flows only through the nitrifying reactor, etc. and this implies that the total nitrification and denitrification times are not necessarily equal. The degree of freedom achieved in this way can be used to adapt the operation to varying conditions. The two-reactor process configuration discussed here is often referred to as the BioDenitro process.

Figure 3B:
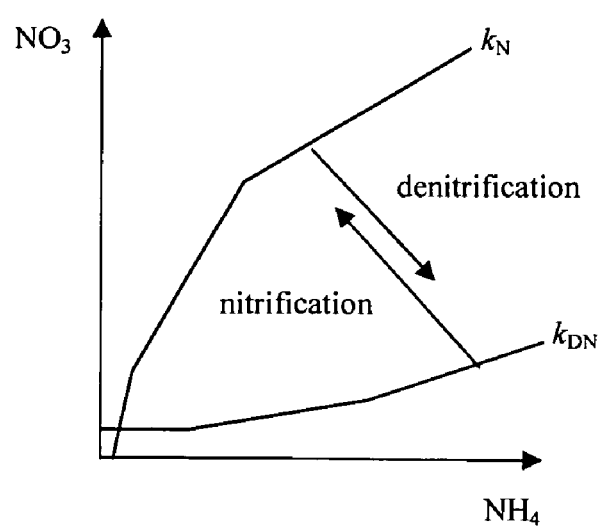
FIG. 3B illustrates the criteria for EBNR in alternating processes. The control strategy utilises $NO_3$ and $NH_4$ measurements.

An alternating control strategy developed for nitrogen removal, i.e. nitrification and denitrification is based on on-line $NO_3$ and $NH_4$ measurements. The criteria for ending the nitrification and the denitrification phases, respectively, are functions of the two measurements. The control strategy is depicted in FIG. 3B as a two dimensional space in which the criteria define the operational region. During the nitrification phase the process moves from right to left and from bottom to top and during the denitrification phase the other way around. As soon as the process crosses a boundary defined by one of the control parameters $k_N$ or $k_{DN}$ the nitrification or denitrification phase is ended. The advantage of this control strategy is that it adapts the phase lengths to load changes and no time and/or energy is wasted due to inappropriate phase lengths. The rule-based structure of the strategy makes it intuitive and optimisation of the criteria is relatively transparent.

Figure 4:
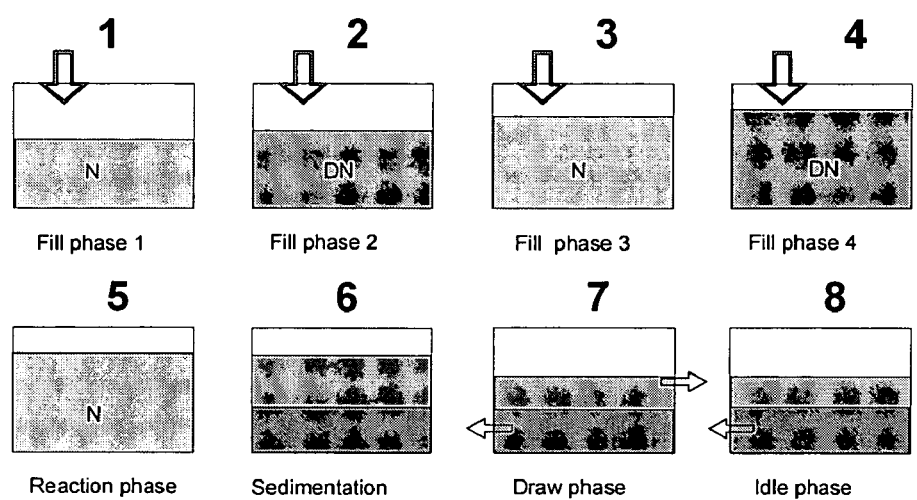
FIG. 4 illustrates the working principle of the SBR.

FIG. 4 illustrates the working principle of the SBR (Sequencing Batch Reactor) tank. In step (1) the tank is filled with wastewater and nitrification is facilitated by aeration. In step (2) aeration is stopped and the system is allowed to reach anaerobic conditions. Denitrification takes place and the phosphorus removing bacteria runs through the cycle as described previously. In step (3) a second filling phase takes place and aeration is restarted resulting in nitrification taking place. During this phase phosphorus is taken up by the phosphorus removing bacteria. In step (4) once more anoxic and aerobic condition are provided in the tank followed by a third filling phase in step (5) where aeration is restarted. When phosphorus has been removed and sufficient amount of the freshly introduced material has been degraded the tank (6) is allowed to settle and sludge and purified water can be passed on (7, 8).

Figure 5:
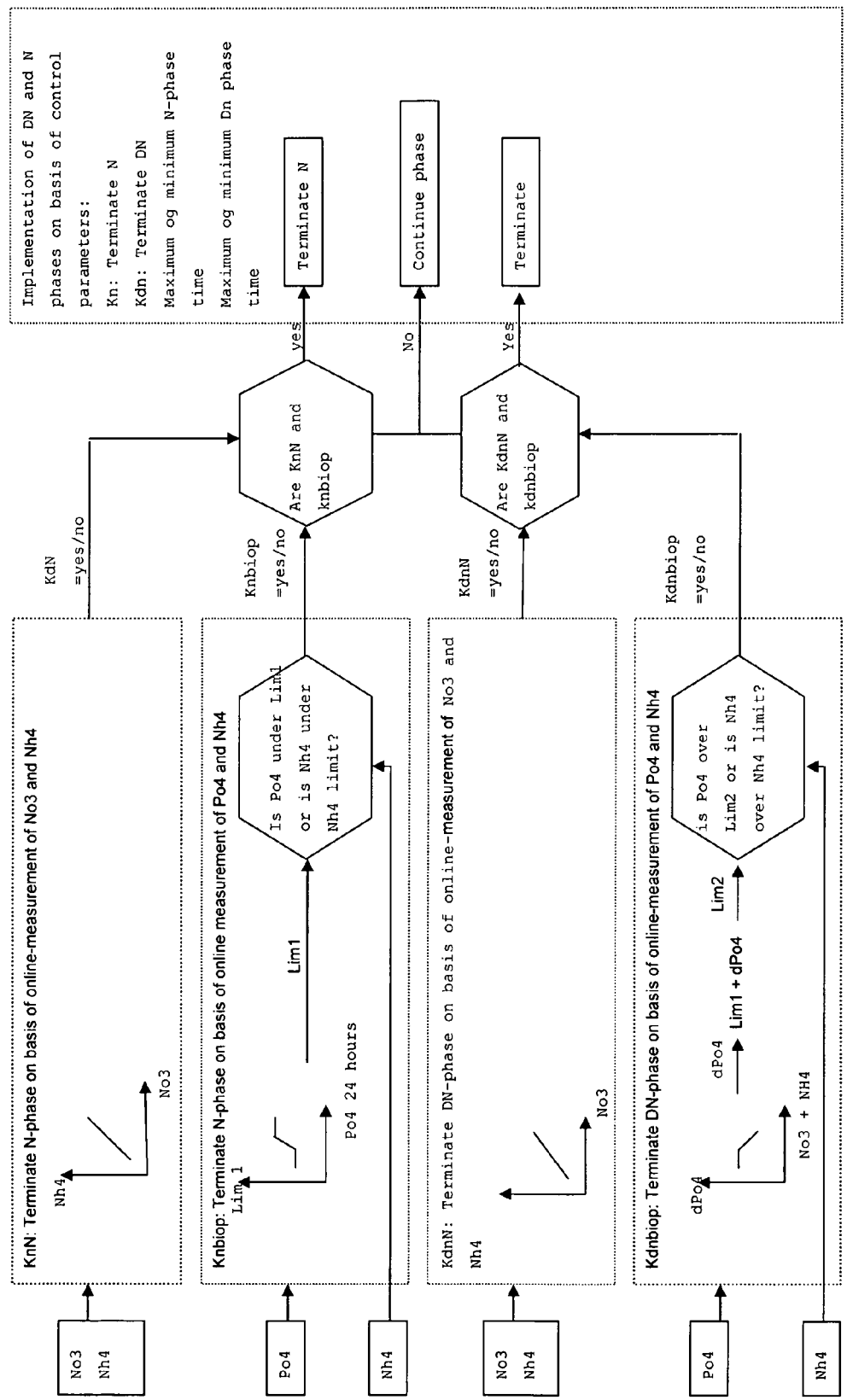
FIG. 5 shows a flow diagram of a control algorithm.

FIG. 5 illustrates an algorithm of a specific control method according to the present invention. $NO_3$, $NH_4$, $PO_4$ are system parameters (sp) and they are measurements of the concentrations of respectively nitrate, ammonium and phosphate. $K_{nN}$, $K_{nbiop}$, $K_{dnN}$ and $K_{dnbiop}$ are control parameters calculated from the system parameters. $K_{nN}$ and $K_{dnN}$ are calculated from $NH_4$ and $NO_3$ according to the following equation:

$$CP(sp_1, sp_2) = \begin{cases} \text{yes} & f(sp_1) \geq sp_2 \\ \text{no} & f(sp_1) < sp_2 \end{cases}$$

Where CP is the resulting control parameters $K_{nN}$ or $K_{dnN}$. $sp_1$ and $sp_2$ are the system parameters $NO_3$ and $NH_4$ and the function $f(sp_1)$ is based on empirical experience. $K_{nN}$ or $K_{dnN}$ are illustrated in FIG. 5 by a curve showing $sp_2$ as a function of $sp_1$. The resulting parameter is determined by where the point $(sp_1,sp_2)$ are placed relative to the curve. If the point $(sp_1,sp_2)$ is above the curve the resulting control parameter is 'yes' and if the point $(sp_1,sp_2)$ is under the curve the resulting control parameter is 'no'.

$K_{nbiop}$ is calculated from $NH_4$ and $Po_4$ according to the following equation:

$$CP(sp_1, sp_2) = \begin{cases} yes & sp_1 < Lim1 \vee sp_2 < Limsp_2 \\ no & Else \end{cases}$$

Where CP is the resulting control parameter $K_{nbiop}$. $sp_1$ and $sp_2$ are the system parameters $PO_4$ and $NH_4$. Lim1 is a function of 24 hours average of and $PO_4$ based on empirical experience. $Limsp_2$ is a fixed limit.

$K_{dnbiop}$ is calculated from $PO_4$, $NH_4$ and $PO_4$ according to the following equation:

$$CP(sp_1, sp_2, sp_3) = \begin{cases} yes & sp_1 > Lim1 + dPo4 \vee sp_2 < Limsp_2 \\ no & Else \end{cases}$$

Where CP is the resulting control parameter $K_{dnbiop}$. $sp_1$, $sp_2$ and sp 3 are the system parameters $PO_4$, $NH_4$ and $NO_3$. Lim1 is a function of 24 hours average of $PO_4$ based on empirical experience. $dPO_4$ is a function of the total concentration of $NH_4$ and $NO_3$ and based on empirical experience. $Limsp_2$ is a fixed limit.

According to the algorithm of FIG. 5 the control parameter $K_{dnN}$ and the control function described above and illustrated by a form of a curve showing $NH_4$ as a function of $NO_3$ are first selected. It is then determined whether to implement a first control action such as aerating, stopping supply of nitrate or keeping aeration stopped and this action is implemented so as to reach anaerobic conditions. A second system parameter being the concentration of $PO_4$ is measured and the second control parameter $K_{dnbiop}$ is selected. A second control function having the control parameter $dPO_4$ as a function of the total concentration of $NH_4$ and $NO_3$ is selected and this function together with a measurement of the concentration of $NH_4$ and on this basis it is determined which control action should be implemented. In this case the choice is between supplying nitrate, aerating and supplying carbon sources. When aerating or nitrate supply is selected and implemented the purifying section leaves anaerobic conditions. When aeration is selected the section goes into aerobic conditions. On the basis of the measured system parameters $NH_4$ and $NO_3$ a third control parameter, $K_{nN}$, is selected together with a third control function described above and illustrated by a curve showing $NH_4$ as a function of $NO_3$. This curve can be the same as earlier or it can be another curve. A third control action is then selected e.g. continue aeration, turning of aeration off and implemented thus letting the section reach anoxic conditions. A $4^{th}$ system parameter being the concentration of $PO_4$ is measured and the $4^{th}$ control parameter $K_{nbiop}$ is selected. A $4^{th}$ control function having $PO_4$ as a function of the 24 hours mean concentration of $PO_4$ is selected and this function together with a measurement of the concentration of $NH_4$ and on the basis of this it is determined which control action should be implemented, e.g. turning of aeration and thus letting the section reach anoxic conditions. By using the $4^{th}$ system parameter the aeration phase can be prolonged if desired.

FIG. 6A and B shows how a control strategy can be adapted to load dependence.

Biological phosphorus activity generates orthophosphate ($PO_4$) dynamics within the operational cycle similar to those of the $NH_4$. High biological phosphorus activity means large variation in $PO_4$ concentration but it has only marginal effect on the average concentration in the reactor. But significantly lower effluent $PO_4$ concentrations can be obtained due to the effluent flow optimisation (i.e. the timing of the outflow) and the fact that the $PO_4$ concentration is positively correlated with $NH_4$ concentration ($PO_4$ is low at the same time as $NH_4$ is low). An EBPR strategy should, consequently, promote the variation in $PO_4$ concentration and this is achieved by introducing an anaerobic phase in the operational cycle.

The basic control idea is simple and could be seen as an add-on to the standard nitrogen removal strategy described earlier. It consists of additional criteria for $PO_4$, which need to be fulfilled in addition to $k_N$ or $k_{DN}$ to end a phase. These additional $PO_4$ criteria are $PO_4<P_{low}$ (end of aerobic phase) and $PO_4>P_{high}$ (end of anaerobic phase), where $P_{low}$ and $P_{high}$ are predefined (or as we will see later, calculated) $PO_4$ limits. The phase cycle is in principle as follows. After depletion of $NO_3$, the anoxic phase is prolonged and, consequently, develops into an anaerobic phase. During the anaerobic phase, the $PO_4$ concentration increases due to the release of cell internally stored phosphorus. The anaerobic phase is ended when $k_{DN}$ is fulfilled and the $PO_4$ concentration is above $P_{high}$. During the following aerobic phase, $PO_4$ will decrease since phosphorus is stored internally by the PAO's. The aerobic phase is continued until $k_N$ is fulfilled and the $PO_4$ concentration is below $P_{low}$. The control strategy can be summarised in two main rules:
end aerobic (N) phase if $k_N$ and $PO_4<P_{low}$ and
end anoxic/anaerobic (DN) phase if $k_{DN}$ and $PO_4>P_{high}$.

So far the strategy is relatively straightforward. However, as described above with fixed predefined values on $P_{low}$ and $P_{high}$, respectively, the strategy would fail as soon as the load to the plant or the biological rates changes. Some additional requirements must be imposed on the strategy for it to be functional and these will be discussed below.

An important prerequisite of the control strategy is that the EBPR should have no or only a minor negative effect on the effluent nitrogen concentrations. This limits the EBPR strategy to periods when there is an excess nitrogen removal capacity (nitrogen_capacity —nitrogen_load>0), since full denitrification is required to obtain anaerobic conditions. This excess capacity is typically encountered when the nitrogen load is low or when the nitrification and denitrification rates are high, e.g. during summer. Of course, the nitrification and denitrification phases can be adjusted to obtain anaerobic conditions even when the plant has no extra capacity, but this would result in a high effluent nitrogen concentration. This is undesired since, in contrast to $PO_4$, precipitation chemicals cannot remove nitrogen. Thus, nitrogen removal must generally be prioritised and EBPR only applied when the nitrogen load is smaller than the nitrogen removal capacity.

Relating the levels $P_{high}$ and $P_{low}$ to the nitrogen load/capacity situation incorporates load dependency in the strategy. This is achieved when $P_{range}$ is a function of the excess removal capacity according to FIG. 6A ($P_{range}=P_{high}-P_{low}$). Thus, low excess capacity yields a small $P_{range}$ and this, in turn, allows the criteria $PO_4>P_{high}$ to quickly be fulfilled, which results in a short (or no) anaerobic time. On the other hand, a large excess capacity yields a large $P_{range}$ and a longer anaerobic time. FIG. 6B illustrates the idea. Consider the phases to the left in the figure. Here, there is excess capacity and, consequently, anaerobic time will be imposed.

It is the $PO_4$ concentration that determines the phase lengths (the nitrogen criteria are fulfilled before the $PO_4$ criteria). However, after the load change, there is no longer excess capacity. $P_{high}$ is lowered, which means that the criterion $PO_4 > P_{high}$ will be fulfilled earlier with a shorter anaerobic phase as result. The following phases are longer as the nitrogen criteria are now determining the phases and therefore, $PO_4$ concentrations are allowed to exceed $P_{high}$ and $P_{low}$. It is important to note that even though it is tempting to think that low values on $P_{high}$ and $P_{low}$ give the best reduction of $PO_4$, it is not possible to maintain these low values for long since the PAO's need anaerobic time to remain in the system.

It is evident that the parameters of the function in FIG. 6A will be very decisive for the strategy and can be used for optimisation of and prioritisation between biological phosphorus and nitrogen removal. The nitrogen removal capacity is generally not available as a variable but it can be estimated utilising the inherent dynamics of an alternating plant. Both the incoming nitrogen load and the current nitrification and denitrification capacity are estimated on-line and the estimates are based on the same measurements as used for the nitrogen criteria, i.e. $NO_3$ and $NH_4$. The slope in the function is directly related to the bio-P activity or more accurately to the biological release and uptake rates of $PO_4$. A steep slope corresponds to high rates, i.e. fully established bio-P activity. The $PO_4$ release and uptake rates can be estimated on-line similar to nitrification/denitrification rates. A strategy which is based on estimates of both nitrogen and phosphorus rates does not only give us a load dependent strategy. It will also adjust itself to the changes in the process, i.e. a fully adaptive strategy.

What remains is to make the prioritisation between nitrogen and phosphorus removal. This is determined by the intercept of the function and the x-axis. A negative value (i.e. at under capacity) puts high priority on phosphorus removal EBPR as it will use some of the nitrogen removal capacity. On the contrary, a positive value on the excess capacity gives a conservative strategy that clearly prioritises nitrogen removal. In the above discussion we have assumed that the function in FIG. 6A is linear. This is not necessarily so and the function may very well be non-linear and discontinuous Saturation on $P_{range}$ should probably be implemented to avoid too high $PO_4$ concentrations.

A simplified version of the function in FIG. 6A is to let $P_{range}$ be a function of the sum of $NO_3$ and $NH_4$ in the reactor. High nitrogen ($NO_4 + NO_3$) concentration results in a low $P_{range}$ and a low concentration gives a high $P_{range}$. This means that the strategy is still load dependent, as the nitrogen concentration in the reactor can be assumed to be a good estimate of the nitrogen load. However, to follow changes in biological rates, manual alterations to the simplified function parameters must be carried out.

The invention claimed is:

1. A method of controlling a wastewater treatment plant having a purifying section comprising a cycle with two phases, a first and a second phase,
   in the first phase aeration of the waste water continues until sufficient nitrification is obtained and an uptake of phosphate reaches a defined level based on a current load or capacity situation,
   in the second phase aeration is stopped and the second phase continues until sufficient denitrification is obtained and until a storage of intercellular compounds in phosphorus accumulation organisms (PAO) reaches a defined level, and then the second phase stops and the first phase starts.

2. The control method according to claim 1, wherein
   the uptake of phosphate in the first phase is quantified by at least one system parameter and at least one control parameter $a_N$ is derived from the at least one system parameter;
   the nitrification of the first phase is quantified by at least one system parameter and at least one control parameter $g_N$ is derived from the at least one system parameter;
   the storage of intercellular compounds in the second phase is quantified by at least one system parameter (A, B, C, . . . ) and at least one control parameter $a_{DN}$ is derived from the at least one system parameter; and
   the denitrification of the second phase is quantified by at least one system parameter and at least one control parameter $g_{DN}$ is derived from the at least one system parameter.

3. A method of controlling a wastewater treatment plant having a purifying section, said method comprising the steps of:
   a) continuously measuring one or more system parameters,
   b) determining a first control parameter on the basis of the measured values from step a) and a first control function,
   c) determining a first control action on the basis of the measured values from step a) and the first control parameter of step b) and subsequently,
   d) implementing the first control action,
   e) letting said purifying section change conditions,
   f) determining a second control parameter on the basis of the measured values from step a) and a second control function,
   g) determining a second control action on the basis of the determined control parameter and subsequently,
   h) implementing the second control action,
   i) letting the purifying section return to the conditions of step b) to d), and
   j) returning to step b).

4. The method according to claim 3, wherein the system parameters in step a) are selected from the group consisting of nitrate concentration, ammonium concentration, phosphate concentration, oxygen concentration, COD (chemical oxygen demand), BOD (biochemical oxygen demand), TOC (total organic carbon) and temperature.

5. The method according to claim 3, wherein the system parameters in step a) are the concentration of $NH_4$, $NO_3$ and the concentration of $PO_4$ and the first control action is selected from the group consisting of stopping supply of nitrate, stopping aeration and keeping the aeration turned off and the second control action is selected from the group consisting of supplying carbon sources, supplying nitrate and starting aeration.

6. The method of any one of claims 1 to 5 including the steps of:
   a) letting the purifying section reach anaerobic conditions at a predetermined time or at a time calculated on the basis of a first measured system parameter, and
   b) leaving the anaerobic conditions at a time calculated on the basis of a second measured system parameter.

7. The method according to claim 6, which further includes the steps of:
   c) letting the purifying section reach aerobic conditions, and d) leaving aerobic conditions at a time calculated on the basis of a third measured system parameter.

8. The method according to claim 6 wherein the purifying section is let to reach anaerobic conditions at a time calculated on the basis of at least two system parameters.

9. The method according to claim 6 wherein the anaerobic conditions are abolished at a time calculated on the basis of at least two measured system parameters.

10. The method according to claim 6 wherein the system parameters are selected from the group consisting of nitrate concentration, ammonium concentration, phosphate concentration, oxygen concentration and temperature.

11. A method assuring increased biological phosphorous removal in a purifying plant with one or more aerated sections comprising the following steps:
   a) continuously determining the concentrations or the rates of formation for $NH_4$, $NO_3$ and $PO_4$;
   b) determining two control parameters: $K_{nN}=f(NH_4, NO_3)$ and $K_{nbiop}=f(PO_4, NH_4)$ on the basis of the concentrations or the rates of formation for $NH_4$, $NO_3$ and $PO_4$;
   c) implementing a control action terminating the nitrification phase when $K_{nN}$ and $K_{nbiop}$ are fulfilled;
   e) letting the purifying section reach anaerobic conditions;
   f) determining two control parameters $K_{dnN}=f(NH_4, NO_3)$ and $K_{dnbiop}=f(PO_4, NH_4, NO_3)$;
   g) determining a control action to terminate the dentrification phase when $K_{dnN}$ and $K_{dnbiop}$ are fulfilled;
   h) implementing the determined control action;
   i) letting the purifying section return to aerobic conditions; and
   j) return to step b).

* * * * *